(12) United States Patent
Vitoorapakorn

(10) Patent No.: US 6,318,681 B1
(45) Date of Patent: Nov. 20, 2001

(54) INSULATING ELEMENT FOR PIPES

(75) Inventor: Pawat Vitoorapakorn, Samutprakarn (TH)

(73) Assignee: Aeroflex International Co. Ltd., Samutprakarn (TH)

( * ) Notice: Subject to any disclaimer, the term of this patent is extended or adjusted under 35 U.S.C. 154(b) by 0 days.

(21) Appl. No.: 09/552,238

(22) Filed: Apr. 19, 2000

(30) Foreign Application Priority Data

Apr. 23, 1999 (CH) .................................................... 0762/99

(51) Int. Cl.$^7$ ...................................................... E21F 17/02
(52) U.S. Cl. ............................. 248/61; 248/74.3; 138/149
(58) Field of Search ............................. 248/60, 61, 74.3, 248/74.5, 909; 174/155, 156, 48, 110 R; 138/137, 141, 149

(56) References Cited

U.S. PATENT DOCUMENTS

| | | | |
|---|---|---|---|
| 1,919,532 | * | 7/1933 | Ryder et al. .......................... 138/141 |
| 3,548,884 | * | 12/1970 | Ambrose .......................... 138/149 X |
| 3,762,982 | * | 10/1973 | Whittington ..................... 138/110 X |
| 4,025,680 | | 5/1977 | Botsolas et al. . |
| 4,351,365 | * | 9/1982 | Bauermeister et al. ............. 138/149 |
| 5,020,481 | * | 6/1991 | Nelson ............................. 138/149 X |

FOREIGN PATENT DOCUMENTS

| | | |
|---|---|---|
| 0329549 | 8/1989 | (EP) . |
| 0503566 | 9/1995 | (EP) . |
| 1137121 | 12/1968 | (GB) . |

* cited by examiner

Primary Examiner—Ramon O. Ramirez
Assistant Examiner—Korie Chan
(74) Attorney, Agent, or Firm—Tarolli, Sundheim, Covell, Tummino & Szabo L.L.P.

(57) ABSTRACT

An insulating element (1) for pipes, for forming a suspending or supporting section, with two carrier strips (1, 2) between which thermally insulating, dimensionally stable and flexible mouldings (5, 6) are alternately arranged. The mouldings (5, 6) are arranged transversely to the longitudinal axis of the carrier strips (2, 3). The insulating element (1) is of a basic continuous shape at least 1 meter long. Individual suspending or supporting sections can be cut off from this basic shape by means of a cutting device. The inner carrier strip (2) facing the pipe which is to be insulated is compression-flexible.

10 Claims, 1 Drawing Sheet

INSULATING ELEMENT FOR PIPES

TECHNICAL FIELD

The invention concerns an insulating element for pipes.

BACKGROUND OF THE INVENTION

Suspending or supporting thermally insulated pipes presents problems due to the fact that conventional insulators are not sufficiently strong for the brackets by which the pipes are to be suspended or supported. Therefore, pipe brackets are generally fixed directly to the pipe. This in turn requires additional insulation for the pipe brackets to prevent formation of undesirable cold or heat bridges. It is obvious that providing additional insulation for pipe brackets is quite expensive.

A pipe insulator for suspending or supporting a pipeline with cold insulation is known from EP 0 503 566. This pipe insulator mainly consists of two hollow cylindrical bush halves provided with an inserted circular segment of thermally insulated rigid cellular material resistant to pressure. This ring element extends over up to three quarters of the outside diameter of the matching cylindrical bush half. The outer skin of the pipe insulator is formed by a metal plate which at the same time forms the pipe bracket.

Therefore, it is the task of the invention to improve the insulating element designed so that it is easy to handle and universal in use.

This task is solved by the features mentioned in the characteristics in Claim 1.

Thanks to the alternating arrangement of dimensionally stable and flexible mouldings between two carrier strips, such an insulating element can on the one hand absorb forces to form a suspending or supporting section; on the other, it is sufficiently flexible to be used for pipes with different diameters.

SUMMARY OF THE INVENTION

For example, a preferred design version provides for an insulating element of a basic continuous shape at least 1 metre long which can be cut up by means of a cutter into individual suspending or supporting sections. This simplifies storage because it is not necessary to store different suspension or supporting sections for each diameter. individual suspending or supporting sections. This simplifies storage because it is not necessary to store different suspension or supporting sections for each diameter.

BRIEF DESCRIPTION OF THE DRAWINGS

An example of a design of the subject of this invention is described here in greater detail with reference to a drawing.

DESCRIPTION OF THE INVENTION

Figure 1:
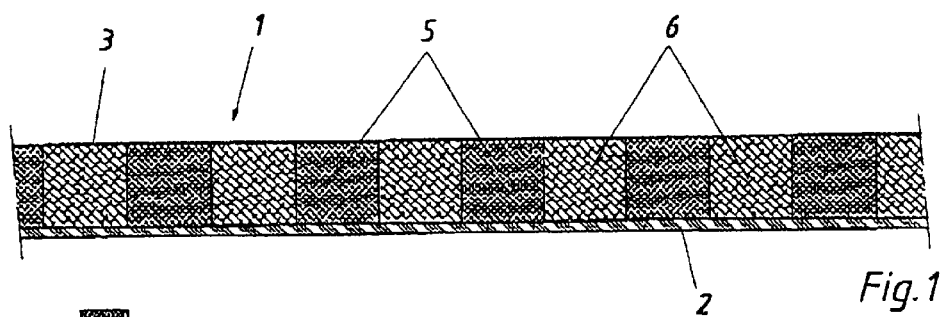
FIG. 1 An insulating element section in its basic shape.

FIG. 1 shows a larger view than the subsequent figures of an insulating element section 1 of a basic continuous shape. The insulating element consists of two carrier strips 2, 3, between which dimensionally stable and flexible mouldings 5, 6 are alternately arranged. The mouldings 5, 6 are arranged transversely to the longitudinal axis of the continuous carrier strips. The inner carrier strip 2 facing the pipe which is to be insulated consists of expanded synthetic rubber while the outer carrier strip 3 is made of synthetic rubber which has not bee expanded. The inner carrier strip 2 has compression-flexible properties which allow it to adjust to the shape of the pipe which is to be insulated. The outer carrier strip 3 is basically strong in tension. Both carrier strips 2, 3 are preferably provided with adhesive on the inside facing the respective mouldings 5, 6. The mouldings 5, 6 are preferably also bonded to each other to form a compact insulating element unit. The flexible mouldings 6 and the inner carrier strip 2 are made of expanded synthetic rubber. The dimensionally stable mouldings 5 are made of rigid cellular material which is very light but dimensionally stable at the same time. The dimensionally stable as well as the flexible mouldings 5, 6 and the two carrier strips 2, 3 have a closed cell structure and do not therefore produce a hygroscopic effect. The width of the mouldings 5, 6 is preferably between 8 and 12 mm to a large extend regardless of their height. This gives then good flexibility with high stability. It is obvious that, on the other hand, the height of the mouldings 5, 6 may vary within a wide range. For example, mouldings 5, 6 up to 50 mm high can be used for large pipe diameters. The width of the continuous strip is normally between 5 and 15 cm.

Apart from synthetic rubber, thermoplasts can also be used for making the carrier strips 2, 3 and the flexible mouldings 6, organic as well as inorganic materials being suitable in principle.

Such insulating elements are preferably produced in lengths of approximately 1 to 3 m. An insulating element can be parted to form an insulating section of the required length by means of a conventional cutting device, for example a knife.

Figure 2:
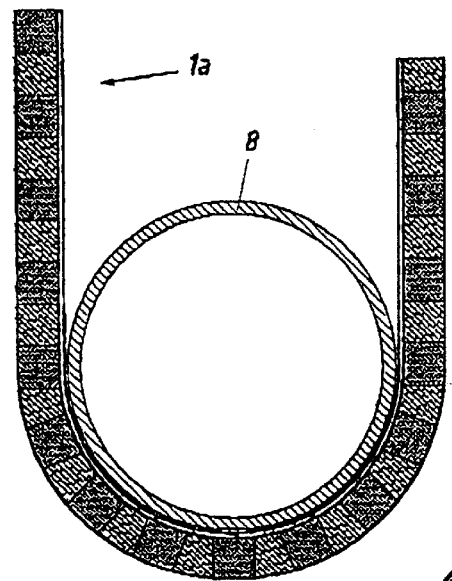
FIG. 2 A cut-off section of an insulating element, in the first phase of being fitted to a pipe.
Figure 3:
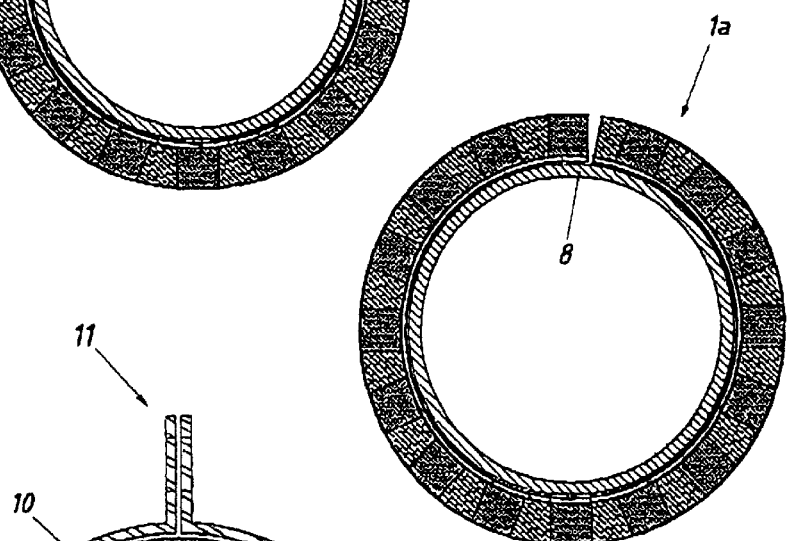
FIG. 3 A section of an insulating element in the second phase of being fitted to a pipe.
Figure 4:
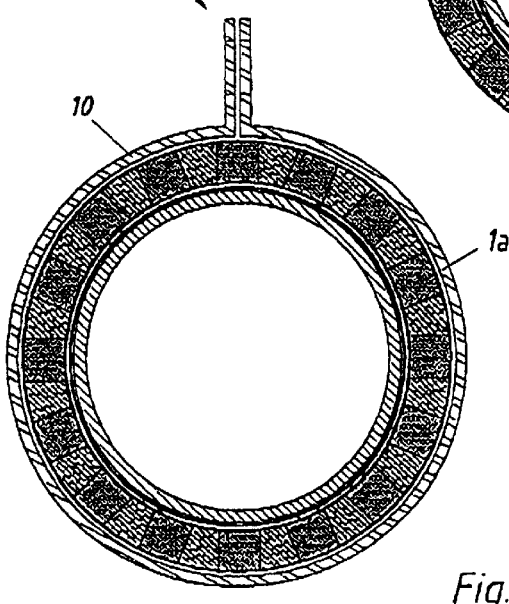
FIG. 4 A section of an insulating element in the third phase of being fitted to a pipe.

FIG. 2 shows a cut-off insulating element section 1a in the first phase of being fitted to the pipe 8. The flexible section 1a is here simply placed round the pipe 8 and moved to the position shown in FIG. 3 in which the pipe 8 is fully wrapped. Subsequently, the insulating element section 1a is fitted with a pipe clip 10 as in FIG. 4 by means of which the insulating element section 1a is compressed on the one side along its inside tightly against the pipe 8, and its two ends are made to meet. On the other, the pipe clip 10 is fitted with the suspending or supporting body 11 by means of which the pipe 8 can be suspended or, if suitably designed, supported. Thanks to the compressionflexible properties of the inner carrier strip 2, the inside of the insulating element section 1a can adjust to the outer shape of the pipe 8

An insulating element 1, 1a for pipes 8, for forming a suspending or supporting section is easy to handle and universally usable since its flexible arrangement can be adapted to a very wide range of diameters. Section 1a can be cut to the required length with a knife from the initial section 1.

Having described the invention, the following is claimed:

1. Apparatus comprising:
   a pipe;
   means for supporting said pipe on an adjacent structure, said means for supporting said pipe comprising an insulating element encircling said pipe and a pipe clip encircling said insulating element and clamping said insulating element against said pipe, said pipe clip having a portion for connection to the adjacent structure;

said insulating element comprising:

first and second moldings engaging and located between inner and outer carrier strips, said first and second moldings being located alternately around the circumference of said pipe;

said inner carrier strip engaging said pipe and being of a compression-flexible material, said outer carrier strip being of non-expanded synthetic rubber and engaging said pipe clip;

said first molding being of rigid and dimensionally stable material when clamped against side pipe by said pipe clip, said second molding being of a compression-flexible material;

said inner carrier strip being clamped against said pipe and adjusting to the surface shape of said pipe when said pipe clip clamps said insulating element against said pipe.

2. An apparatus according to claim 1 wherein, said insulating element is of a basic continuous shape at least 1 meter long which can be cut up into individual suspending or supporting sections by means of a cutting device.

3. An apparatus according to claim 1 wherein, said first and second moldings are between 5 and 15 mm wide.

4. An apparatus according to claim 3 wherein, said first and second moldings are between 8 and 12 mm wide.

5. An apparatus according to claim 1 wherein, said outer carrier strip is substantially strong in tension.

6. An apparatus according to claim 1 wherein, said inner and outer carrier strips are made of thermoplasts.

7. An apparatus according to claim 1 wherein, both of said inner and outer carrier strips are provided on one side with adhesive for said first and second moldings.

8. An apparatus according to claim 1 wherein, said second molding is made of expanded, synthetic rubber or a thermoplast.

9. An apparatus according to claim 1 wherein, said first and second moldings are made of a rigid and porous material.

10. An apparatus according to claim 1 wherein, said first and second moldings are made of a material which does not produce a hygroscopic action, in particular from a material with a closed cellular structure.

* * * * *